(12) United States Patent
Wecht

(10) Patent No.: US 8,767,412 B2
(45) Date of Patent: Jul. 1, 2014

(54) VOLTAGE SUPPLY

(75) Inventor: Gerhard Wecht, Rimbach (DE)

(73) Assignee: Robert Bosch GmbH, Stuttgart (DE)

( * ) Notice: Subject to any disclaimer, the term of this patent is extended or adjusted under 35 U.S.C. 154(b) by 633 days.

(21) Appl. No.: 13/121,819

(22) PCT Filed: Sep. 1, 2009

(86) PCT No.: PCT/EP2009/006314
§ 371 (c)(1),
(2), (4) Date: Jun. 3, 2011

(87) PCT Pub. No.: WO2010/037455
PCT Pub. Date: Apr. 8, 2010

(65) Prior Publication Data
US 2011/0221267 A1    Sep. 15, 2011

(30) Foreign Application Priority Data
Oct. 1, 2008  (DE) .......................... 10 2008 050 067

(51) Int. Cl.
*H02M 3/335*  (2006.01)
*H02M 1/32*  (2007.01)

(52) U.S. Cl.
USPC ..... 363/16; 363/21.08; 363/21.16; 363/56.01

(58) Field of Classification Search
USPC .......... 363/21.02, 21.08, 21.16, 56.04, 56.08, 363/56.11, 16
See application file for complete search history.

(56) References Cited

U.S. PATENT DOCUMENTS 6,480,400 B2 *  11/2002  Wu et al. ..................... 363/21.01
6,721,192 B1    4/2004  Yang et al.
7,116,564 B2 *  10/2006  Takahashi .................. 363/21.16
7,339,804 B2 *  3/2008  Uchida ......................... 363/56.1
2008/0043504 A1  2/2008  Ye et al.
2008/0175026 A1  7/2008  Yang

FOREIGN PATENT DOCUMENTS

JP    7015956    1/1995
JP    7087733    3/1995

OTHER PUBLICATIONS

International Search Report, PCT/EP2009/006314, corresponding to U.S. Appl. No. 13/121,819, Feb. 3, 2010.

* cited by examiner

*Primary Examiner* — Jessica Han
(74) *Attorney, Agent, or Firm* — Hodgson Russ LLP

(57) ABSTRACT

Control devices can be destroyed or damaged by their supply voltage in the event of malfunction. The voltage supply according to the present invention comprises a means (12) having a primary part (121) and secondary part (122), the primary part (121) being connected to the voltage source (10) and being controllable by means of the voltage output (112) of the voltage converter (11), and the secondary part (122) comprising a first and a second mutually independent winding, a supply voltage for the control device being made available by means of the first winding, and the second winding being connected to the voltage input (111) of the voltage converter (11) so that a supply voltage, additional to the voltage source (10), for the voltage converter (11) is implemented by means of the second winding. The manner in which the object of the invention is achieved thus enables a delayed shutoff (in particular with automatically self-adjusting off delay times) of the control device upon actuation of the key switch, and reliable operation of the control device.

5 Claims, 1 Drawing Sheet

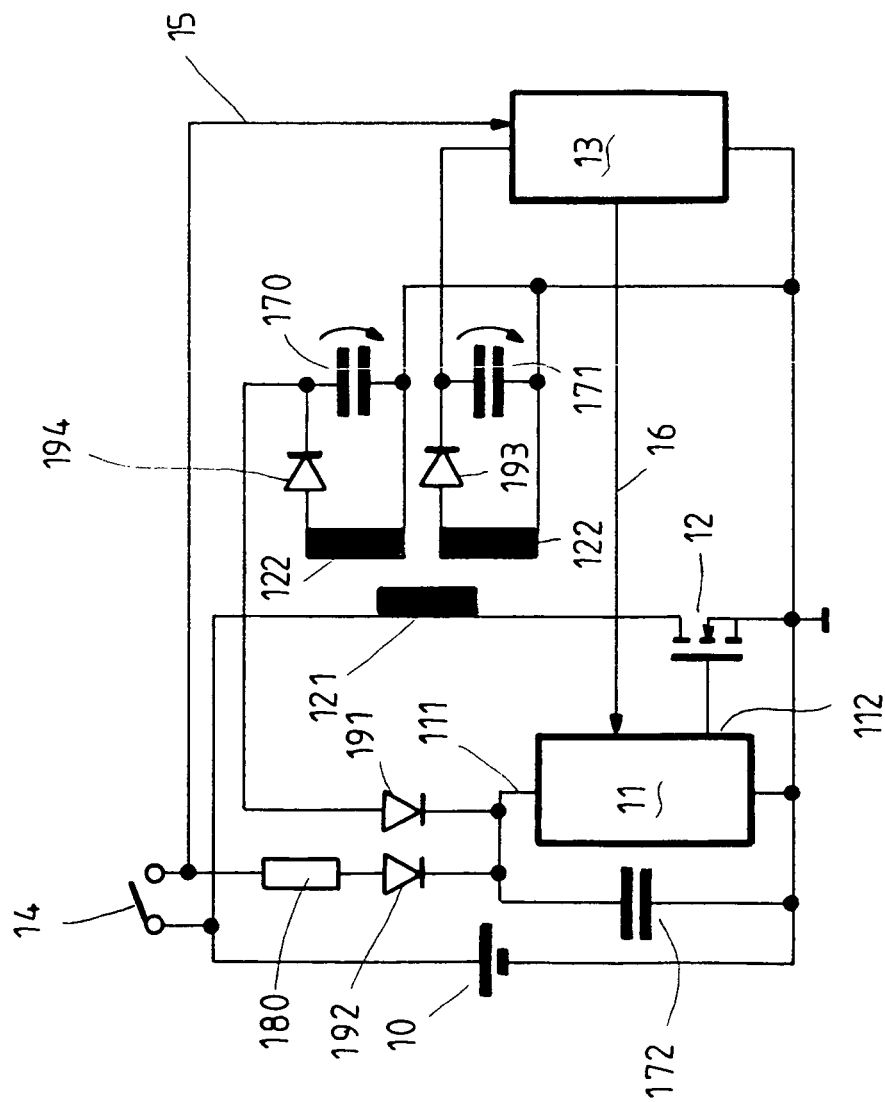

VOLTAGE SUPPLY

BACKGROUND OF THE INVENTION

The invention relates to a voltage supply.

Voltage supplies for control devices are known from the existing art. These voltage supplies usually comprise a voltage source as well as a DC/DC converter having a voltage input and voltage output. The voltage input can be connected to the voltage source, for example, by means of a key switch.

This arrangement has the disadvantage that a control device supplied with power by the voltage supply can immediately lose its supply voltage upon actuation of the key switch, so that any control programs that may presently be running are interrupted and, depending on the application reliable operation of a machine operated by the control device can also no longer be ensured.

SUMMARY OF THE INVENTION

To avoid this, the capability of implementing a delayed shutoff of the control device upon actuation of the switch must be created.

The invention creates such a capability by providing a means having a primary part and a secondary part, the primary part being connected to a central voltage source and being controllable by means of the voltage output of the voltage converter. In addition, the secondary part comprises a first and a second winding that are galvanically independent of one another, a supply voltage for the control device being made available by means of the first winding, and the second winding being connected to the voltage input of the voltage converter so that a supply voltage, additional to the voltage source, for the voltage converter can be implemented by means of the second winding.

Additional switches for implementing a delayed shutoff can thus be omitted; in addition, the input and output of the voltage converter are decoupled from one another. By means of this additional supply voltage, a delayed shutoff of the voltage converter can now be implemented if its voltage supply should be shut off, for example by means of a switch.

By means of the mutually galvanically independent windings that are comprised, any conceivable input voltage can be adapted to the desired output voltage by influencing the transformation ratio (e.g. selecting the number of turns of the windings). The central voltage supply furthermore has no direct connection to the control device and thus cannot do any damage to the control device. All the voltages to the secondary-side windings can be designed so that the potential differences that can be generated cannot damage the connected peripheral. Especially when the invention is used in connection with recharging systems, in which the central voltage source can be charged by fed-back energy, it is possible to prevent that energy from arriving at the control device, for example, in the form of a current overshoot or voltage overshoot. The invention moreover helps to eliminate the need for additional shutoff means.

In the case of control devices that can be actuated, for example, by means of ignition locks, it is now possible to implement an off delay time for the supply voltage of the control device.

The voltage supply according to the present invention preferably comprises a control output by means of which a status signal regarding the voltage of the voltage converter can be transmitted to a control device. This has the advantage that upon shutoff of the voltage supply, for example by means of a key switch, the control device can be informed of this event at an early stage, so that the control device can automatically prepare its own shutoff. For this purpose the control device would need, for example, to regularly poll (task mode) and evaluate the status signal.

Advantageously, there is provided on the voltage supply according to the present invention a control input by means of which a shutoff signal is deliverable to the voltage converter, the voltage converter being embodied in such a way that it automatically shuts off the voltage output upon detection of the shutoff signal. This makes it possible for the voltage converter to be remotely controllable by means of an external signal. For example, the control device could furnish this shutoff signal when it has, as described above, automatically completed the preparations for its own shutoff.

A control device having a voltage supply according to the present invention preferably comprises a means for evaluating a status signal according to the present invention and/or a means for implementing a shutoff signal according to the present invention, so that the control device and/or the voltage converter can be automatically shut off using these means and in conjunction with the voltage supply according to the present invention. Off delay times of different lengths can thus automatically be implemented, since by means of the control device it is possible to define when shutoff will occur.

The approach according to the present invention could be used, for example, in the context of vehicles operated hydraulically, electrically, or by means of internal combustion engines, or in the context of the implementation of hybrid vehicles, as a voltage supply of the control devices provided for these applications. Forklift trucks in particular could be equipped with a voltage supply according to the present invention and/or with a control device according to the present invention.

BRIEF DESCRIPTION OF THE DRAWING

FIG. 1 is a schematic showing the circuit of the present invention.

The invention will be described below by way of example, with reference to a schematic drawing. The implementation in terms of circuit engineering shown here does not in any way limit the invention to this approach. The use of different components, and a different arrangement of the components, is likewise conceivable in order to implement the effects according to the present invention.

DETAILED DESCRIPTION OF THE INVENTION

The circuit shown here was developed for implementing the voltage supply of a control device for a forklift truck. The circuit is dimensioned so that an input voltage range between 8 VDC and 200 VDC is possible. This type of voltage supply with an off delay time is conceivable in all types of control devices in motor vehicles that are equipped with a voltage source having an output voltage in the aforesaid range.

The circuit comprises a central voltage source 10 that can be connected by means of a switch 14 to input 111 of a voltage converter 11. Input 111 is located between resistor 180 and capacitor 172, the two of which form a low-pass filter and thus optimally protect voltage converter 11 from electromagnetic interference during its startup phase. Later, i.e. during the working phase, voltage converter 11 is operated via diode 191 by means of the voltage drop at capacitor 170. Switch 14 can then be opened. Windings 121 (primary winding) and 122 (secondary windings) form a transfer unit that can be controlled by means of output 112 of voltage converter 11 using transistor 12 (switching power supply principle).

When switch 14 (e.g. a key switch in a motor vehicle) is closed, capacitor 172 is charged by means of resistor 180 and decoupling diode 192. As soon as the capacitor has reached a specific threshold voltage, voltage converter 11 commences operation and begins to control transistor 12, with the result that a voltage is built up in both capacitor 170 and capacitor 171. Respective diodes 194 and 193 are provided for rectification. The voltage building up at capacitor 171 serves to supply power to control device 13; the voltage building up at capacitor 170 serves to supply power to voltage converter 11. With the buildup of voltage at capacitor 171, the connected control device 13 commences operation as soon as the voltage has reached the necessary threshold value. When switch 14 is then opened, the supply voltage for voltage converter 11 continues to be ensured even without voltage source 10, and likewise the voltage supply to control device 13, since the control device can continue to be powered from voltage source 10 by means of transfer unit 121, 122.

Control device can continuously poll the status of switch 14 by means of control signal output lead 15 of the voltage supply according to the present invention (level-adapted control signal). As soon as the signal is active (e.g. switch detected as open), control device 13 can begin the defined shutoff of its internal computation unit (CPU) and, for example, store operating status data in a nonvolatile memory (RAM). As soon as this process is complete, control device 13 can report this status, by means of a control signal input lead 16 comprised by the voltage supply according to the present invention, to voltage converter 11 so that the latter can cease operation and so that the control device can also automatically shut off. Transistor 12 is then permanently blocked, and the output voltages at capacitors 170, 171 are thereby dissipated. The process repeats only after key switch 14 is actuated again. Voltage converter 11 can be a so-called "flyback converter" that controls transistor 12, for example, by means of a pulse-width-modulated control voltage. Transfer unit 121, 122 works, in one specific mode, as an energy reservoir, by storing energy on the primary side during the conductive control phase of transistor 12 and then delivering that energy again on the secondary side in the blocking control phase of transistor 12. Transfer unit 121, 122, or storage transformer 121, 122, comprises a core having an air gap. Windings 121, 122 are entirely arranged, and magnetically coupled, on this core. The pulse duty factor of the control voltage is automatically adjusted by voltage converter 11 in consideration of the transformation ratio of the transfer unit.

Adaptation of the arrangement for higher voltage sources can be implemented by introducing a preregulator between resistor 180 and diode 192.

This circuit has the advantage that only a single central switch 14, designed for the rated current that is present, is required. The galvanic decoupling between central voltage supply 10 at input 111 of voltage converter 11 and the voltage input of the control device means that in the event of a fault (short circuit), it is possible to prevent the full voltage of central voltage supply 10 from being applied to the input of control device 13 and possibly destroying it. This is particularly important for vehicle voltages above 12 volts or for electrically driven vehicles in which braking energy is fed back into the central voltage supply (battery) with the result that a considerable voltage overshoot can occur in the central voltage supply. It is furthermore possible by means of the approach according to the present invention to effect an adaptation to these different voltages of the central voltage supply, and to compensate for rapid voltage overshoots in the central voltage supply.

The invention claimed is:

1. A voltage supply for a control device (13), comprising a voltage source (10) as well as a voltage converter (11) having a voltage input (111) and voltage output (112), the voltage input (111) being capable of being connected to the voltage source (10), wherein a primary part (121) and secondary part (122) are provided, the primary part (121) being connected to the voltage source (10) and being controllable by the voltage output (112) of the voltage converter (11), and the secondary part (122) comprising a first and a second mutually independent winding, a supply voltage for the control device (13) being made available by the first winding, the second winding being connected to the voltage input (111) of the voltage converter (11) so that a supply voltage for the voltage converter (11) is implemented by the second winding, wherein the voltage input (111) of the voltage converter is connected to the voltage source (10) by a switch (14) additionally comprised by the voltage supply; and a control output (15) is configured to transmit a status signal of the switch to the control device (13).

2. The voltage supply according to claim 1, a control input (16) being provided whereby a shutoff signal is deliverable to the voltage converter (11), the voltage converter (11) being embodied in such a way that it shuts off the voltage output (112) upon detection of the shutoff signal.

3. A control device having a voltage supply according to claim 1, the control device (13) being implemented in such a way that the control device (13) can shut off the voltage converter (14) in consideration of a status signal (15), in particular after an off delay time.

4. A vehicle operated in mobile hydraulic or electrical fashion or by means of an internal combustion engine, or a hybrid vehicle, in particular a forklift truck, having a control device in accordance with claim 3.

5. A voltage supply for a control device, comprising:
a switch configured to be connected to a voltage source;
a voltage converter having a voltage input and voltage output, the voltage input being connected to the switch such that the switch is configured to selectively couple the voltage input to the voltage source;
a transformer having a primary part and secondary part, wherein the primary part is configured to be connected to the voltage source and controlled by the voltage output of the voltage converter, and wherein the secondary part comprises a first winding configured to supply a voltage to the control device and a second winding connected to the voltage input of the voltage converter to supply a voltage to the voltage converter; and
a control output configured to transmit a status signal of the switch to the control device.

* * * * *